US010091060B2

(12) United States Patent
Croy et al.

(10) Patent No.: US 10,091,060 B2
(45) Date of Patent: Oct. 2, 2018

(54) ROBUST SERVICE DEPLOYMENT

(71) Applicant: International Business Machines Corporation, Armonk, NY (US)

(72) Inventors: Timothy R. Croy, Ballymena (GB); Paul B. French, Cork (IE); Robert P. Fulton, Larne (IE); Trevor Graham, Hillsborough (GB); Kevin M. Hamilton, Belfast (GB)

(73) Assignee: International Business Machines Corporation, Armonk, NY (US)

( * ) Notice: Subject to any disclaimer, the term of this patent is extended or adjusted under 35 U.S.C. 154(b) by 918 days.

(21) Appl. No.: 14/216,475

(22) Filed: Mar. 17, 2014

(65) Prior Publication Data
US 2014/0325042 A1  Oct. 30, 2014

(30) Foreign Application Priority Data

Mar. 18, 2013 (GB) .................................. 1304874.9

(51) Int. Cl.
*G06F 15/177* (2006.01)
*H04L 12/24* (2006.01)
(52) U.S. Cl.
CPC .......... *H04L 41/082* (2013.01); *H04L 41/145* (2013.01); *H04L 41/5054* (2013.01); *H04L 41/0803* (2013.01)
(58) Field of Classification Search
None
See application file for complete search history.

(56) References Cited

U.S. PATENT DOCUMENTS 8,082,335 B2   12/2011  Mishra et al.
8,180,847 B2 *  5/2012  Berkland ................ H04L 29/06
                                                              709/217

(Continued)

FOREIGN PATENT DOCUMENTS

WO   WO2012072763 A1   6/2012

OTHER PUBLICATIONS

Kessal et al., "QoS Based Service Provisioning in NGN/NGS Context," Proceedings of the 7th International Conference on Network and Service Management (CNSM), Oct. 2011, 5 pages.

*Primary Examiner* — Hamza N Algibhah
*Assistant Examiner* — John Fan
(74) *Attorney, Agent, or Firm* — Yee & Associates, P.C.; Richard Wilhelm

(57) ABSTRACT

A method, system and program product for deploying a service on a network comprising a plurality of network resources, the method comprising providing an actual network model comprising network resources and the configurations of the network resources; providing a computer-implemented network configuration management system controlling the actual network resource configurations in the actual model; providing a service description comprising network resource configuration information for implementing the service on specific network resources; selecting a set of available network resources for deploying the service in the network based on the service description; reserving available network resources for deploying the service in an off-line version of the actual network model, the off-line version including updated network resource configurations to reflect the changes to the configurations of the actual network resources triggered by the deployment of the service; and deploying the service by updating the actual network model using the off-line version.

12 Claims, 5 Drawing Sheets

(56) References Cited

U.S. PATENT DOCUMENTS

| | | | | |
|---|---|---|---|---|
| 8,230,222 | B2 * | 7/2012 | Celli | G06F 21/125 380/286 |
| 8,335,851 | B1 * | 12/2012 | Vendrow | G06F 8/60 700/99 |
| 8,745,205 | B2 * | 6/2014 | Anderson | H04L 9/3213 709/224 |
| 2006/0039364 | A1 * | 2/2006 | Wright | H04L 41/0893 370/352 |
| 2006/0075102 | A1 | 4/2006 | Cupit | |
| 2007/0220521 | A1 | 9/2007 | Chevanne et al. | |
| 2008/0147671 | A1 * | 6/2008 | Simon | G06F 17/30899 |
| 2010/0299411 | A1 | 11/2010 | Stewart et al. | |
| 2013/0185433 | A1 * | 7/2013 | Zhu | H04L 67/303 709/226 |

* cited by examiner

ROBUST SERVICE DEPLOYMENT

This Application claims the benefit of priority to United Kingdom Patent Application Serial No. GB 1304874.9, filed on Mar. 18, 2013, the contents of which are hereby incorporated by reference.

FIELD OF THE INVENTION

The present invention relates to a method of deploying a service on a network comprising a plurality of network resources.

The present invention further relates to a computer program product comprising computer program code for implementing such a method.

The present invention yet further relates to a computer system for executing the computer program code.

BACKGROUND

Nowadays, service provision over distributed networks plays an integral part of daily life. Many households and businesses utilize one or more services that are provided over such networks. Examples of such services include Internet, TV, IP telephony and so on. Such services typically need to be deployed over the network by reconfiguring parts of the network to facilitate a requested service. This, however, is not without problems.

For instance, between checking if a network resource is available for the provisioning of the requested service and the actual deployment of the service, a supposedly available resource may have been used, which consequently results in a failed deployment of the requested service. This is highly undesirable, as customers can quite easily become dissatisfied with a service provider because of a perceived lack of reliability. It furthermore compromises the efficiency of the operations of the service provider, as it requires additional cost to rectify such deployment failures that cannot be passed onto the end user.

In order to improve the planned provisioning of a requested service, such a requested service may be mapped onto an abstract representation of the network resources, which may contain reservation tables for available resources. This however does not prevent selected resources becoming unavailable, as reserved resources can be consumed by another (unscheduled) service deployment in the time period between reservation and deployment of the reserved service. Moreover, due to the diversity of vendor specific configuration implementations, such tables tend to be normalized, i.e. abstracted from bespoke configurations. This means that not all the configuration items of the requested service may be identified at a detailed enough level to reliably reserve all the required aspects of the service. Consequently, this approach also suffers from a high degree of deployment failures due to the fact that the abstraction level in the provisioning model means that certain implementation details of the service are unavailable in the model for reservation, such that during deployment of the service by a service engineer in the field, it may be discovered that these implementation details cannot be realized, e.g. due to unavailability.

US 2006/0075102 A1 discloses a method for provisioning a service on a communication network including receiving a service order comprising a service request. The service request relates to a service provided on a communication network. The method includes analyzing the service order to determine a plurality of network elements to provision to complete the service request and one or more network resources of the communication network required to complete the service request. The method includes retrieving a configuration profile for each of the plurality of network elements and reserving the one or more network resources of the communication network required to complete the service request. The method also includes preparing a service template for each of the plurality of network elements using the configuration profile for each of the plurality of network elements. The service templates are capable of being delivered to respective network elements for execution. The method also includes delivering each service template to a respective network element for execution to fulfill the service order.

Even though this method reduces the service deployment failure rate, there is still a risk that such failures occur, for instance because of conflicting service templates being issued as there is no way of detecting if a resource has already been reserved by a service yet to be deployed, such that upon the attempted execution of the service template, the requested resource may no longer be available, e.g. because of the prior execution of a conflicting service template or the scheduled resource having been consumed in another way.

BRIEF SUMMARY OF THE INVENTION

The present invention seeks to provide a more robust method of deploying a service on a network comprising a plurality of network resources.

The present invention further seeks to provide a computer program product for implementing this method.

The present invention yet further seeks to provide a computer system adapted to implement this method.

According to an aspect of the present invention, there is provided a method of method of deploying a service on a network comprising a plurality of network resources, the method comprising providing an actual network model comprising network resources and the configurations of said network resources; providing a computer-implemented network configuration management system controlling the actual network resource configurations in said actual model; providing a service description comprising network resource configuration information for implementing the service on specific network resources; selecting a set of available network resources for deploying said service in said network based on said service description; reserving available network resources for deploying said service in an off-line version of said actual network model, said off-line version including updated network resource configurations to reflect the changes to the configurations of the actual network resources triggered by the deployment of the service; and deploying said service by updating the actual network model using said off-line version.

By providing an off-line version of an a network model used to manage the overall configuration of the network, other service reservations as well as deployments can be evaluated against this off-line configuration, thus presenting the opportunity to detect potential conflicts, e.g. when a reserved network resource is attempted to be reserved or consumed, e.g. by the deployment of another service, thereby reducing the risk of service deployment failures. Specifically, because an actual configuration model for the devices to is used to implement reservation rather than have a separate abstract model solely for recording reservations, the risk of service deployment failures is significantly reduced.

Preferably, the off-line version of the actual network model comprises the actual configuration of a reserved network resource and configuration items of the reserved network resource that are reserved for the deployment of said service such that the actual state and scheduled future states of the network resources can be accurately monitored at any point in time, without the overhead of a separate abstract model maintained solely for the purposes of reservation tracking.

Another advantage of the use of such off-line configurations is that the off-line version of the actual network model may be compared against a network operating policy (either pre- or post-deployment of the service) such that for instance the off-line updated network resource configuration may be adjusted if the off-line updated network resource configuration contravenes said policy, thus improving the compliance of service deployment with network policies.

The method may further comprise generating a service identification key for said reservation; receiving a request to activate a service, said request comprising a further key; comparing the service identification key with the further key; and deploying said service in case the service identification key matches the further key. This ensures that the service to be deployed can be readily and accurately identified.

Furthermore, by labeling the deployed network resources with said service identification key, it is possible to readily handle a received service termination request comprising the service identification key by identifying the deployed network resources labeled with said service identification key; and returning the labeled deployed network resources to a pool of available actual network resources identified within the network configuration management system, thus assisting resource recovery and preventing the occurrence of stranded assets.

In a preferred embodiment, the method further comprises monitoring proposed changes to the actual network resource configurations; and checking if the proposed changes conflict with the updated network resource configurations in the off-line version of the actual network model to further reduce the service deployment failure rate.

In the case of such a conflict, the method may for instance further comprise at least one of rejecting the proposed changes to the actual network resource configurations; and generating a notification message signaling a conflict between the proposed changes to the actual network resource configurations and the updated network resource configurations in the off-line version of the actual network model, receiving a reply to said notification message and accepting or rejecting the proposed changes in response to said reply in order to prevent potential service deployment failures.

In a particularly advantageous embodiment, the network resource configuration information further comprises selection criteria for flexible network resources in the network, the method further comprising altering the updated network resource configurations in said off-line version in line with said selection criteria to resolve said conflict. This embodiment utilizes the fact that many specific network resources are typically equipped to deliver multiple instances of a network function through configurable implementation, such that upon an attempted duplication of the same configuration details, the method is capable of intervention by altering the configuration details of the reserved service (or of the service seeking reservation) as such configuration details form part of the network resource configuration information.

According to another aspect of the present invention, there is provided a computer program product comprising a computer-readable storage medium including computer program code which when executed on one or more processors of a computer system implements at least one embodiment of the method of the present invention.

In an embodiment, the computer-readable storage medium may be selected from a CD, DVD, flash memory card, a USB memory stick, a random access memory, a read-only memory, a computer hard disk, a storage area network, a network server and an Internet server.

According to yet another aspect of the present invention there is provided a computer system comprising an embodiment of the computer program product of the present invention and at least one processor adapted to execute the computer program code. Such a computer system benefits from an improved robustness against service deployment thereon for the reasons already explained above.

The computer system may further comprise a user interface for controlling the network configuration management system.

The computer system may further comprise a network interface for connecting to the network for hosting said service.

BRIEF DESCRIPTION OF THE DRAWINGS

Preferred embodiments of the present invention will now be described, by way of example only, with reference to the following drawings, in which.

DETAILED DESCRIPTION OF THE EMBODIMENTS

Figure 1:
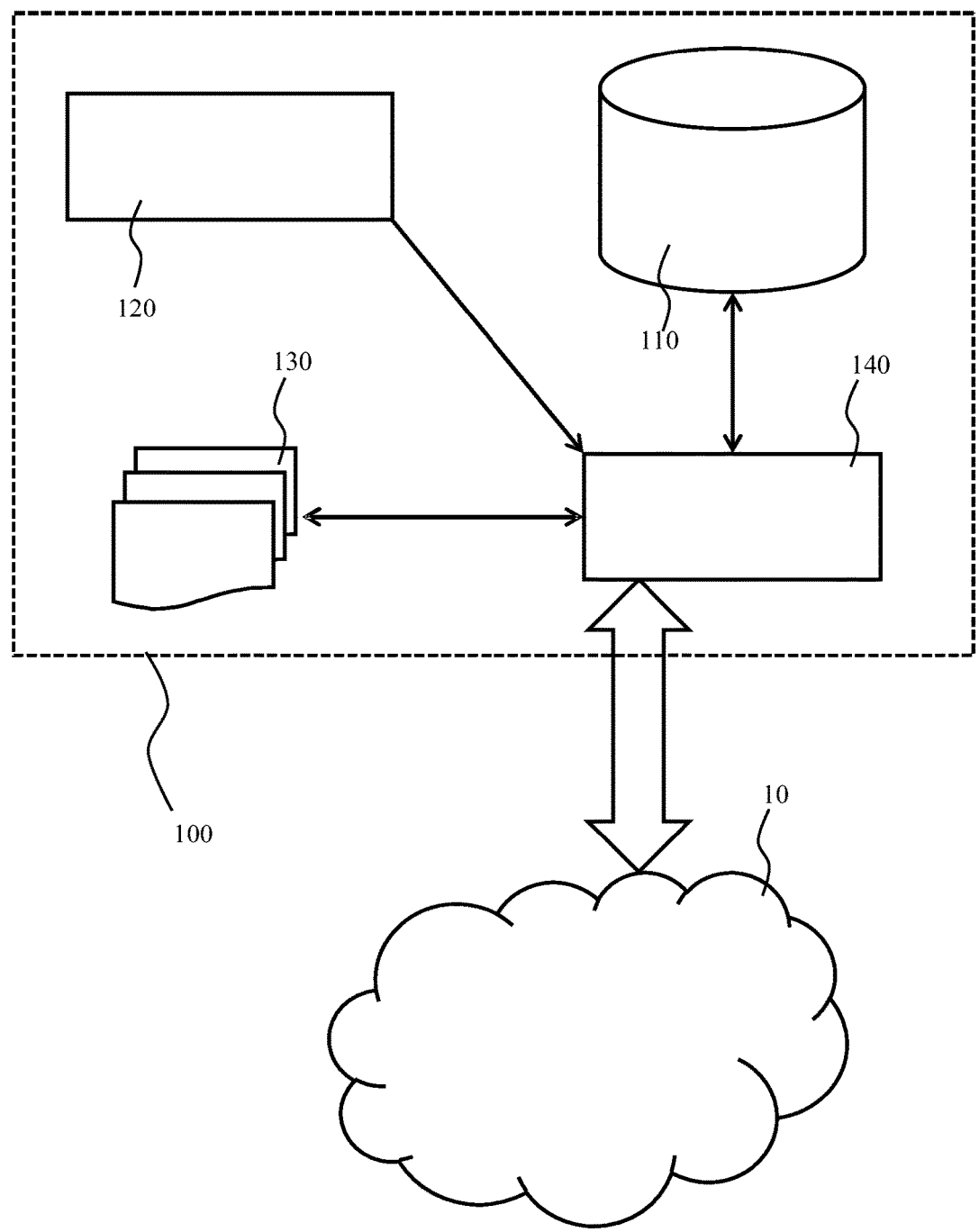
FIG. 1 schematically depicts a service deployment system according to an embodiment of the present invention.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The various embodiments of the method of the present invention may be stored as executable computer program code on a computer program product comprising a computer-readable storage medium. The computer-readable storage medium may be any medium that can be accessed by a computer for the retrieval of digital data from said medium. Non-limiting examples of a computer-readable storage medium include a CD, DVD, flash memory card, a USB memory stick, a random access memory, a read-only memory, a computer hard disk, a storage area network, a network server, an Internet server and so on.

In the context of the present application, a (computer) system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

FIG. 1 schematically depicts a computer system 100 implementing a service deployment system according to an embodiment of the present invention. The computer system 100 is connected to a network 10 in any suitable manner and equipped with the task of managing the configuration or state of the network 10. The network 10 may be any suitable network for delivering a service provided by a service provider to a consumer of the service, e.g. an end user. To this end, the network 10 typically comprises a plurality of interconnected network devices for delivering a plurality of services from a plurality of service providers to a plurality of end users.

Consequently, such a network 10 typically has a high degree of configurability and/or diversity in terms of type and make of network devices, including devices from different manufacturers that are included in the network to perform the same function, e.g. static resources such as VLANs, switch ports and so on, as well as configurable resources such as Cisco® access control lists, Juniper® zones and so on, to name just a few of the many examples of such different devices to be used in such networks as will be apparent to the skilled person. The overall pool of such network devices will also be referred to as network resources in the present application.

The first group of resources is static in the sense that the configuration of such resources cannot be changed, for instance because they implement a physical connection. Such resources can therefore be easily represented in abstract resource reservation models, as the configuration requirements for the deployment of a service on such resources will not depend on differences between devices provided by different vendors, such that an abstract or generalized representation of such devices can be made in such reservation models without loss of implementation detail, e.g. "provide vlan #7 on port #10 of device #23 for service #4".

On the other hand, for the second group of resources, i.e. the configurable resources, vendors typically adopt bespoke approaches for more complex configuration areas such as security policies. Such vendor-specific configuration approaches are typically lost when generalizing the resource in an abstract reservation model, which can therefore lead to the failure of the deployment of a service for which the required resources are reserved in such an abstract or generalized reservation model due to the fact that upon deployment, it may be found that the required vendor-specific configuration required for the deployment of an aspect of the service on a device falling within the second group of resources cannot be realized because the required resource is not available.

The computer system 100 according to an embodiment of the present invention addresses this problem in the following manner. The service deployment system implemented by the computer system 100 includes a network configuration management system 140 that controls the actual configuration of the network 10 under management. To this end, the configuration management system 140 comprises a model in which each network resource and its actual configuration is represented. In an embodiment, any change to the configuration of a network resource is deployed by the configuration management system 140, e.g. by remotely controlling the configurable network resource in any suitable manner. In other words, the network configuration management system 140 is in charge of managing and controlling the respective configurations of the actual network resources of the network, i.e. contains representation of actual network resources, including vendor-specific configuration details.

However, in practice it may be difficult to have all changes to the network configurations deployed by the network configuration management system 140, for instance because manual changes cannot be prohibited or avoided. In such scenarios, the actual network configuration may be constantly or periodically monitored by the network configuration management system 140 to detect manual changes to the configuration of a monitored network resource. Upon the detection of such a manual change, the network configuration management system 140 may apply an alignment mechanism that forces a realignment of the actual configuration state of the affected network resource, and to any reserved service deployment in an off-line version of the actual network model that is affected by the manual change to the network configuration, as will be explained in more detail below.

The computer system 100 may comprise any suitable user interface (not shown) for controlling the network configuration management system 140, e.g. a terminal including a display and control device such as a keyboard, mouse, track ball, and so on, or combinations thereof.

This allows for the future deployment of a service without the need to make reservations in an abstract resource model, as the actual network model includes configurable representations of network resources which can be mapped onto requested services using appropriate rules and policies, as will be explained in more detail below.

The computer system 100 further comprises a provisioning system 120 adapted to receive a service deployment request, identify the requested service and pass information about the requested service, e.g. its identification information onto the configuration management system 140.

In particular, the provisioning system 120 has an interface to the configuration management system 140 which allows it to request that the resources for a particular service instance should be reserved, or that the service instance should be created or terminated. The configuration management system 140 comprises an offline repository of device configurations held in a suitable configuration model 110 and a set of service definitions 130 which can be used by the configuration management system 140 to determine which devices are appropriate (in terms of capability and availability) to support a particular service instance. The configuration model 110 model may be stored in any suitable manner, e.g. in table form on a suitable data storage device, e.g. memory, hard disk, storage area network, network accessible storage and so on, on the computer system 100.

The provisioning system 120 is configured to inspect the configuration model 110 with reference to an appropriate service definition 130 to identify a set of available and appropriate resources that meet the criteria for service delivery. For example, particular points may be selected as they are physically connected to an appropriate customer premise or geographic location, or because they support a particular required network function such as a specific bandwidth or quality of service capability. The selected resources are marked as 'reserved' in the offline configuration model 110.

In addition, configuration management system 140 may require additional information that identifies a level of correlation between the various network resources that cannot be identified solely in the configuration management system 140. For instance, consider a port X connected to customer A and a port Y connected to customer B. Also consider that customer A's traffic is on vlan #I whilst customer B's traffic is on vlan#II. It is imperative that no traffic is configured on port B with vlan #I, or on port A with vlan #II. Such service characteristics must be specified in a planful manner with knowledge that there is a correlation between a physical connection (the ports) and a customer on the one hand and traffic (on a vlan) and a customer on the other hand. This level of correlation detail cannot be learnt from the configuration of the network 10 and hence must be provided from an external source, i.e. a combination of the provisioning system 120, which can be seen to provide the network configuration management system 140 with information related to the specific instance of the service (such as geographic or contractual constraints); and the service definitions 130 which codify the appropriate rules and policies that will allow the network configuration management system 140 to deploy the requested service on the network.

However, it should be understood that the correlation information not present at the level of the resource configuration model may be provided to the network configuration management system 140 in any suitable manner. For instance, in an alternative embodiment (not shown), the configuration management system 140 may have direct access to a database comprising the information concerning the correlation between the various network resources, in which case the provisioning system 120 may simply provide the network configuration management system 140 with the requested service identification information. In yet another embodiment, the provisioning system 120 is a sub-module of the network configuration management system 140.

Figure 2:
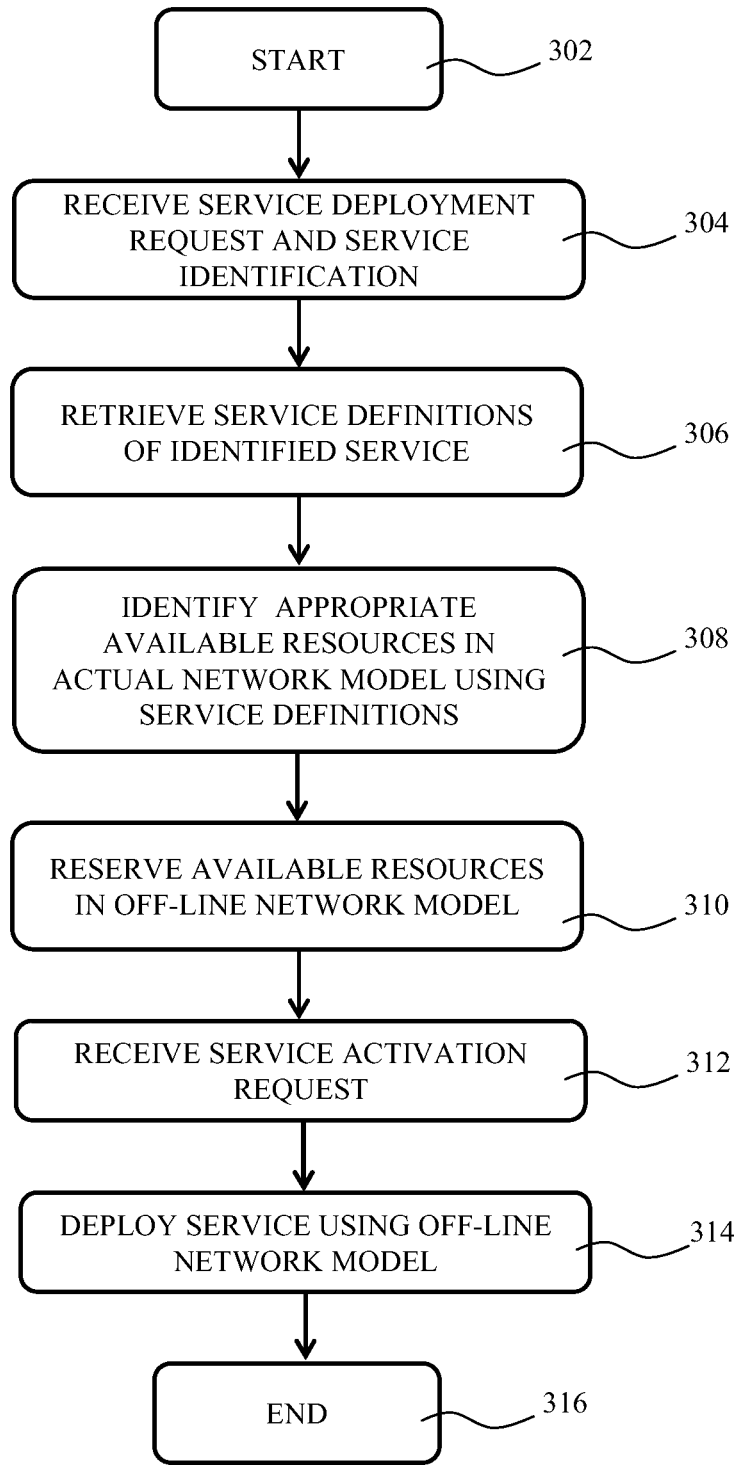
FIG. 2 depicts a flow chart of a service deployment method according to an embodiment of the present invention.

FIG. 2 is a flow chart of an embodiment of a service deployment method of the present invention. The method starts in step 302, upon which it proceeds to step 304 in which the network configuration management system 140 receives the identified service deployment request and service identification information as previously explained from the provisioning system 120. In step 306, the network configuration management system 140 retrieves the service definitions of the requested service from a repository 130 of service definitions, which comprises a complete definition of each service that may be deployed on the network 10, including criteria for selecting additional resources that are required to deliver the service on a particular device, i.e. the aspects that may be bespoke to a particular piece of equipment or vendor. In other words, the service definition allows a bespoke device configuration required for the deployment of the service to be mapped onto the model of the actual network resources. In an embodiment, the service definitions are created and maintained by network engineers. A service definition may be created in-line with the initial roll-out of the service, and may be modified if the service characteristics are changed, e.g. the bandwidth of a broadband service offering is adjusted, to correct defects or bugs in the service definition, or may be changed to reflect changes in the network characteristics, e.g. when new vendor equipment is deployed in the network 10.

The network configuration management system 140 subsequently proceeds to step 308, in which the appropriate actual network devices in the network 10 are identified using the information provided by the provisioning system 120 and the service definitions from the repository 130 to facilitate the deployment of the requested service. In other words, the details as provided by the provisioning system 120 are combined or fused with the device- and service-specific implementation details as retrieved from the service definition from the repository 130 in order to complete a picture of the deployment task on the network 10.

At this point, the network configuration management system 140 is ready to configure the network 10 for the future deployment of the requested service. To this end, the network configuration management system 140 proceeds to step 310, in which an off-line copy of the actual configuration of the network 10 is generated. This off-line version of the network configuration typically comprises the actual configuration of each actual device in the network 10 as well as the changes to the configuration of the device triggered by the deployment of the requested service. The network configuration management system 140 subsequently updates the configurations of the actual network devices as determined in step 308 in the off-line configuration that are required for the deployment of the service. In a particularly preferred embodiment, this is achieved by reserving the configuration items of the selected devices in the off-line network configuration that are required for the deployment of the service. The reserved configuration items are typically flagged such that they can be identified as belonging to the deployment of the requested service. This may for instance be achieved by tagging each configuration item with a key that is unique to the requested service, e.g. by recording this key alongside each reserved configuration item.

Hence, a unified model at the configuration level is created that contains both the actual resource configurations as well as the intended configuration changes that result from the deployment of the requested service. The important consequence of this approach is that the model is free from abstraction or mapping, such that changes to the configuration can be assessed in real-time.

Upon receiving a request to activate or deploy the service in step 312, the network configuration management system 140 proceeds to step 314 in which the instance of the requested service is activated on the actual network 10 by activating those reserved configuration items of the network 10 that can be identified in the off-line configuration as belonging to the requested service activation. As will be apparent to the skilled person, only those resources that are not yet configured correctly need to be (re-)configured. The configuration items may for instance be identified by the key that is unique to the service to ensure that only permitted changes are made to the network 10, e.g. that only the correct network resources are activated, after which the deployment of the service is completed and the method terminates in step 316. The service deployment request may include a further key that can be compared with the keys assigned to reserved network configuration items in the off-line network configuration, such that network configuration items for which the assigned key matches the further key may be released for deployment.

In an embodiment, step 314 may further comprise updating the actual resource configuration model. For instance, upon the successful deployment of the requested service, the 'actual' network configuration should mirror the off-line configuration. In a particularly advantageous embodiment, each resource configuration may include a Boolean flag, which may be toggled to indicate that the configuration is active.

At this point, it is noted that a considerable amount of time may lapse between the reservation of the configuration items in step 310 and the actual deployment of the service as triggered by the request received in step 312. During this interval, the configuration management system 140 may monitor attempts to allocate available network resources of the network 10, e.g. by receiving a request to release a particular network resource for consumption by e.g. another service. Such attempts potentially jeopardize the deployment of the previously reserved service, for instance if the requested resources have already been reserved for use by the previously reserved service.

Figure 3:
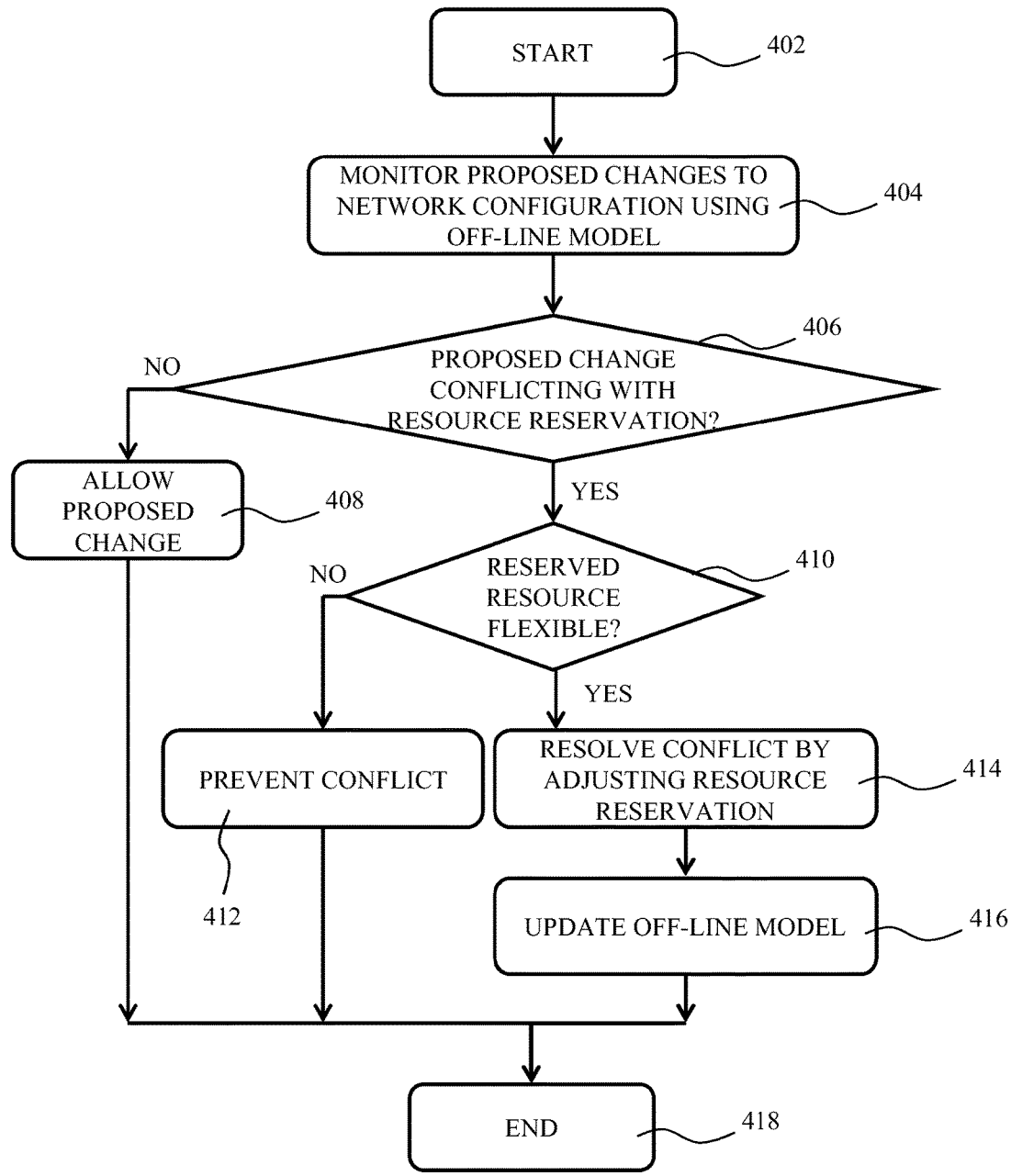
FIG. 3 depicts a flow chart of an aspect of a service deployment method according to an embodiment of the present invention.

To prevent such conflicts, the configuration management system 140 may further implement the method shown in FIG. 3. This method starts in step 402, after which the method proceeds to step 404 in which the configuration management system 140 monitors proposed changes to the configuration of the network 10. Specifically, the configuration management system 140 checks the off-line network configuration in step 406 if the monitored proposed changes to the network 10 overlap, i.e. conflict, with the resource reservations in the off-line network configuration. If this is not the case, the method may proceed to step 410 by simply allowing to proposed change after which the method may terminate in step 418.

On the other hand, if such a conflict is detected in step 408, the method proceeds to step 412 in which the configuration management system 140 checks if the conflict involves a flexible resource, i.e. a resource in which the resource item as reserved for the deployment of the reserved service is a flexible resource, i.e. a resource that is implemented by adopting a specific configuration on an actual network device, where such a specific configuration is not mandated by a physical connection but for instance is implemented in software, in which case it may be possible to alter the reserved configuration item on the network device without jeopardizing the deployment of the reserved service.

If it is determined in step 410 that the resource is a static resource, i.e. cannot be reconfigured, e.g. because it is a physical connection dictated by geographic location, the method proceeds to step 412 in which the conflict is prevented, before terminating the method in step 418. The prevention of the conflict may be achieved in a number of ways. In an embodiment, the proposed change to the network 10 is simply refused before terminating the method in step 418, thereby enforcing the reservation of the service as achieved in step 310.

In an alternative embodiment, the configuration management system 140 generates a notification message signaling the detected conflict between the proposed changes to the actual network resource configurations and the off-line network resource configuration for a network manager to assess how the conflict should be resolved. The network manager may, for instance, reply to the message by instructing the configuration management system 140 to accept or reject the proposed changes in response to said reply, although it should be understood that the acceptance of such conflicting resource allocations should preferably only be allowed if the network manager can guarantee that the future deployment of the service reserved in the off-line network configuration is not compromised.

If, on the other hand, it is determined in step 410 that the conflict involves a reserved flexible resource, the configuration management system 140 may alter the configuration of the reserved resource to overcome the conflict in step 414 and update the off-line network configuration accordingly in step 416 before terminating in step 418.

Figure 4:
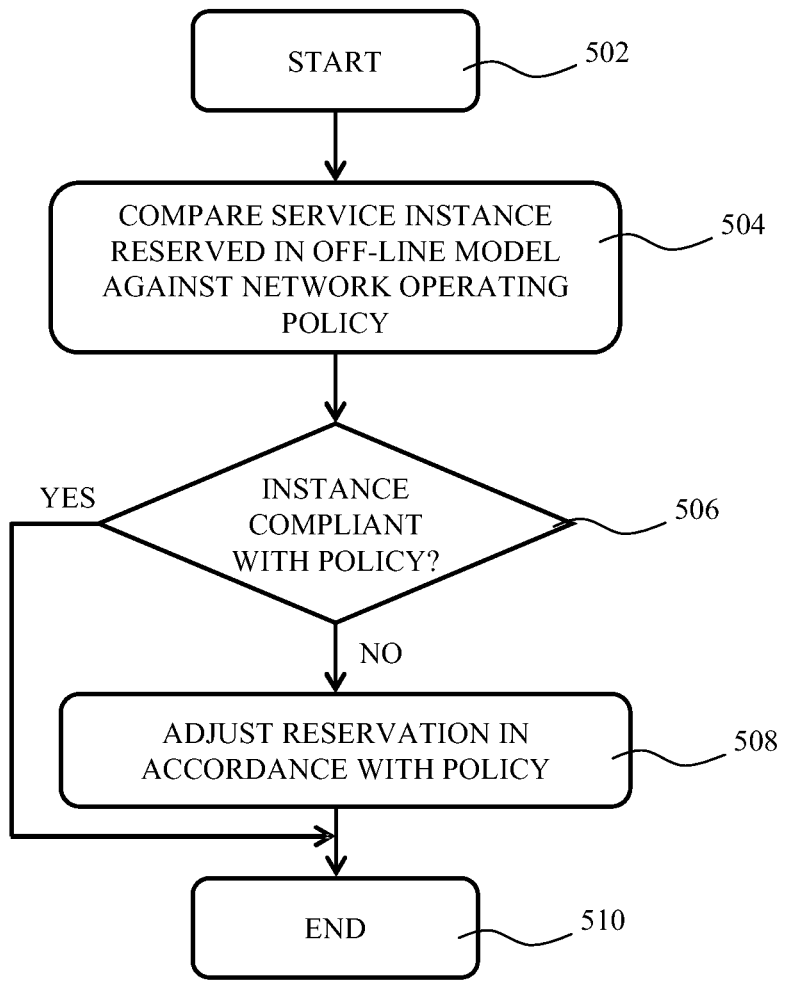
FIG. 4 depicts a flow chart of another aspect of a service deployment method according to an embodiment of the present invention.

In accordance with yet another aspect of the present invention, the configuration management system 140 may be configured to evaluate the effect of the reserved configuration items to deploy the requested service as per step 310 against network operating policies. To this end, the configuration management system 140 may be adapted to implement the method as shown in FIG. 4. This method starts in step 502, after which the method proceeds to step 504 in which the configuration management system 140 compares the service instance against governing network operating policies and/or tolerances. An example of such a network policy may be that a service, such as a broadband service, is to be offered at a contention ratio no better than 20:1. The configuration management system 140 in this particular example can check if the committed bandwidth on the ports of the network devices that face the end user requesting the broadband service does not exceed $\frac{1}{20}^{th}$ of the trunk or server port.

Figure 5:
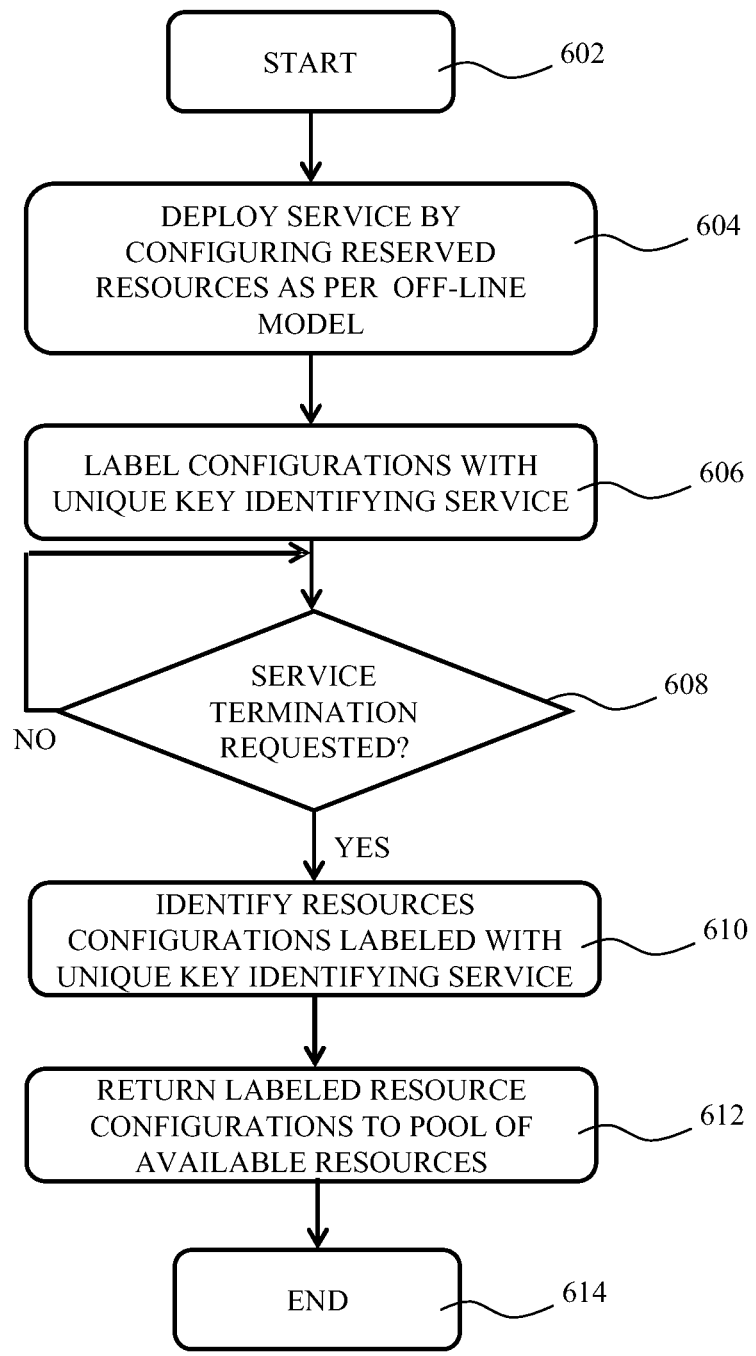
FIG. 5 depicts a flow chart of yet another aspect of a service deployment method according to an embodiment of the present invention.

If the configuration management system 140 decides in step 506 that the service instance complies with the relevant network operating policies, the method may terminate in step 510. On the other hand, if the configuration management system 140 decides in step 506 that the service instance does not comply with the relevant network operating policies, the method proceeds to step 508 in which the configuration management system 140 adjusts the reservation of the network resource configuration items for the deployment of the requested service such that the deployed service complies with the relevant network operating policies prior to terminating the method in step 510. It is noted that the same policies and evaluation method may be applied pre- and post-deployment as the same configuration model is evaluated in both instances, as the only difference between the configuration model pre- and post-deployment may be that a resource configuration that was previously labeled as scheduled or reserved has become active, e.g. by toggling a Boolean flag as previously explained, as the only change to the network resource configuration items upon deployment of the requested service is that their state has been altered from 'reserved' to 'activated' or 'actual'. In an embodiment of the service deployment method of the present invention, the unique key identifying the service is persisted against the underpinning network resources following the deployment of the service, e.g. by labeling the underpinning network resources with this key in the on-line version of the network configuration. This has the advantage that upon termination of the service, the underpinning network resources can be readily identified and returned to a pool of available resources, e.g. for future service deployment, thereby avoiding resources becoming stranded because it is not clear at the network management level that the resources have become redundant. A method for implementing this principle is shown in FIG. 5, which may be implemented by the configuration management system 140.

The method starts in step 602 after which the method proceeds to step 604 in which a service is deployed as per the reserved configuration items in the off-line network configuration model as explained in more detail with the aid of FIG. 3. Step 604 may be identical to step 314. The method proceeds to step 606, in which the deployed network resources are labeled with an identifier such as a key unique to the deployed service instance to identify that the deployed resources implement this service.

In step 608, the configuration management system 140 (periodically) checks if a request to terminate a deployed service has been received. As soon as a request has been received to terminate such a service instance, as for instance identified by its unique key, the method proceeds to step 610 in which the configuration management system 140 tears down the service, which includes identifying those network resources associated with this unique key, removes this association, e.g. by deleting the unique key in the resource label, and returns the released network resources to a pool of available network resources that may be used for the deployment of future service requests before terminating in step 614.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method of deploying a service on a network comprising a plurality of network resources, the method comprising:
   providing an actual network model comprising network resources and configurations of the network resources;
   providing a computer-implemented network configuration management system controlling the configurations of the network resources in the actual network model;
   providing a service description comprising network resource configuration information for implementing the service on specific network resources;
   selecting a set of available network resources for deploying the service in the network based on the service description;
   reserving available network resources for deploying the service in an off-line version of the actual network model, the off-line version including updated network resource configurations to reflect changes to the configurations of the network resources triggered by a deployment of the service;
   generating a service identification key for the reserved network resources;
   labeling the reserved network resources with the service identification key;
   receiving a request to activate the service, the request comprising a further key;
   comparing the service identification key with the further key;
   deploying the service in case the service identification key matches the further key by updating the actual network model using the off-line version;
   receiving a service termination request comprising the service identification key;
   identifying deployed network resources labeled with the service identification key; and
   returning the labeled deployed network resources to a pool of available actual network resources identified within the network configuration management system.

2. The method of claim 1, wherein the off-line version of the actual network model comprises an actual configuration of a reserved network resource and configuration items of the reserved network resource that are reserved for the deployment of the service.

3. The method of claim 1, further comprising comparing the off-line version of the actual network model against a network operating policy and adjusting the off-line version if the off-line version contravenes the policy.

4. The method of claim 3, wherein the step of comparing the off-line version of the actual network model against a network operating policy comprises comparing the configuration items of the reserved network resource against the policy.

5. The method of claim 1, further comprising:
   monitoring proposed changes to actual network resource configurations; and
   checking if the proposed changes conflict with the updated network resource configurations in the off-line version of the actual network model.

6. The method of claim 5, wherein in case of such a conflict, the method further comprises at least one of:
   rejecting the proposed changes to the actual network resource configurations;
   generating a notification message signaling a conflict between the proposed changes to the actual network resource configurations and the updated network resource configurations in the off-line version of the actual network model;
   receiving a reply to the notification message; and
   accepting or rejecting the proposed changes in response to the reply.

7. The method of claim 5, wherein the network resource configuration information further comprises selection criteria for flexible network resources in the network, the method further comprising altering the updated network resource configurations in the off-line version of the actual network model in line with the selection criteria to resolve the conflict.

8. A computer program product comprising a non-transitory computer-readable storage medium including computer program code stored thereon which, when executed on one or more processors of a computer system, implements the method of claim 1.

9. The computer program product of claim 8, wherein the computer-readable storage medium is selected from a CD, DVD, flash memory card, a USB memory stick, a random access memory, a read-only memory, a computer hard disk, a storage area network, a network server and an Internet server.

10. A computer system comprising the computer program product of claim 8 and at least one processor adapted to execute the computer program code.

11. The computer system of claim 10, further comprising a user interface for controlling the network configuration management system.

12. The computer system of claim 10, wherein the computer system further comprises a network interface for connecting to the network for hosting the service.

* * * * *